(12) United States Patent
Jursa et al.

(10) Patent No.: US 12,301,620 B2
(45) Date of Patent: May 13, 2025

(54) DETECTING MALICIOUS URL REDIRECTION CHAINS

(71) Applicant: Avast Software s.r.o., Prague (CZ)

(72) Inventors: David Jursa, Prague (CZ); Jiří Šembera, Pardubice (CZ); Peter Kováč, Prague (CZ); Tomáš Trnka, Prague (CZ); Elnaz Babayeva, Prague (CZ)

(73) Assignee: Avast Software s.r.o., Prague (CZ)

( * ) Notice: Subject to any disclaimer, the term of this patent is extended or adjusted under 35 U.S.C. 154(b) by 267 days.

(21) Appl. No.: 17/653,379

(22) Filed: Mar. 3, 2022

(65) Prior Publication Data

US 2023/0283632 A1 Sep. 7, 2023

(51) Int. Cl.
*H04L 9/40* (2022.01)
*G06F 16/955* (2019.01)

(52) U.S. Cl.
CPC ...... *H04L 63/1483* (2013.01); *G06F 16/9566* (2019.01)

(58) Field of Classification Search
CPC ............. G06F 16/9566; H04L 63/1483; H04L 63/1416; H04L 63/1425; H04L 63/1441; H04L 63/1466; H04L 63/168
See application file for complete search history.

(56) References Cited

U.S. PATENT DOCUMENTS

| | | | |
|---|---|---|---|
| 8,997,228 B1 * | 3/2015 | Satish | H04L 63/14 726/23 |
| 9,912,680 B2 | 3/2018 | Torres et al. | |
| 2010/0031362 A1 * | 2/2010 | Himberger | H04L 63/168 726/25 |
| 2018/0293330 A1 | 10/2018 | Kovac | |
| 2020/0374313 A1 * | 11/2020 | Manoselvam | G06N 20/00 |
| 2021/0120013 A1 * | 4/2021 | Hines | G06N 3/045 |

FOREIGN PATENT DOCUMENTS

| | | | | |
|---|---|---|---|---|
| CN | 106605205 B | * | 7/2019 | ............. G06F 21/51 |
| KR | 20220102086 A | * | 7/2022 | |

OTHER PUBLICATIONS

"Malicious Domain: Preventing the Problem"—Business Reporter, Technology, May 2021 https://www.business-reporter.co.uk/technology/malicious-domains-preventing-the-problem-may 2021 (Year: 2021).*
"Check a Website's Reputation with Website Categorization API and Other Tools"—Website Categorization Blog, Website Categorization API, Feb. 12, 2021 https://website-categorization.whoisxmlapi.com/blog/check-a-websites-reputation-with-website-categorization-api-and-other-tool (Year: 2021).*

* cited by examiner

*Primary Examiner* — Randy A Scott
(74) *Attorney, Agent, or Firm* — AVEK IP, LLC; Mark C. Young (57) ABSTRACT

Malicious redirects in a redirect chain as a result of loading a web address are detected and blocked. A suspicion score is determined for a subject redirection domain based at least in part on the subject redirection domain's web address, and a rate of occurrence of the subject redirection domain in redirect chains leading to a malicious landing domain is calculated. Loading the subject redirection domain is blocked if the suspicion score exceeds a suspicion threshold or the rate of occurrence of the subject redirection domain exceeds a rate of occurrence threshold.

18 Claims, 4 Drawing Sheets

DETECTING MALICIOUS URL REDIRECTION CHAINS

FIELD

The invention relates generally to avoiding malicious URLs (Uniform Resource Locator Internet addresses), and more specifically to detecting and avoiding malicious URL redirection chains.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Because some websites contain content that is malicious, such as code that is executed automatically upon visiting the site or malicious code that infects a user's computer when it is selected or downloaded, a variety of tools help protect against malicious websites. Blacklists list sites known to host malicious content, and client antimalware software detects malware encountered while using a web browser or when downloaded on the user's computer. Web browser plugins or other detection mechanisms can use blacklists and other methods to block access to known malicious websites, or to warn users and get their consent or approval before visiting such websites. But, those who host malicious content on websites are aware of such safeguards, and often move content to different websites or use a process called redirection to lead a user to a malicious site without the user explicitly clicking on the malicious site.

In one such example, a user clicking on a web link that appears benign and is not on a website blacklist is directed to the selected website, which then redirects the user to a site that is malicious. Malicious advertisements hosted on legitimate websites through third-party advertising services often contain such hidden redirects, which in typical examples may go through several redirects before landing on the malicious website. Because preventing visits to malicious sites typically relies on knowing the identity of a link such as via a distributed blacklist and preventing the user from visiting it such as via a detection mechanism, such as a rowser plugin, long chains of redirects and changing destination addresses for malicious content often avoid such measures.

For reasons such as these, a need exists for improved methods of detecting and handling malicious URL redirects in computers.

SUMMARY

One example embodiment comprises a method of identifying malicious redirects in a redirect chain as a result of loading a web address. A suspicion score is determined for a subject redirection domain based at least in part on the subject redirection domain's web address, and a rate of occurrence of the subject redirection domain in redirect chains leading to a malicious landing domain is calculated. Loading the subject redirection domain is blocked if the suspicion score exceeds a suspicion threshold or the rate of occurrence of the subject redirection domain exceeds a rate of occurrence threshold.

The details of one or more examples are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing passwords and other information from a computer or using the computer for unintended purposes. These safeguards prevent infection from malware such as ransomware, and protect the user's personal information such as identity, credit card numbers, and computer use habits and interests from being captured by others.

Malicious websites or web links are a growing problem, and are difficult for even cautious users to avoid. Links that appear benign may be redirected, often several times, leading to a malicious website. Even well-trusted websites often host ads from third parties selected automatically such as via an auction format, such that the ads may contain malicious content or web addresses not endorsed or hosted by the trusted website. Clicking on the ad directs a user through a series of one or more redirects to a malicious site, which installs and/or executes malware on the user's computer. Similarly, legitimate sites are often hacked and web links changed to include links to malicious web content, again typically using redirects to mask the eventual destination site hosting malicious content.

Discovering and mitigating malicious web content reached through redirects is difficult, in large part because the web traffic and activity looks like legitimate web traffic up to the point of infection. Manual analysis conducted later rarely reveals anything of particular use, since attackers change the domains and servers used for redirects and malicious content hosting frequently. A need therefore exists for improved detection and handling of redirects to malicious web content.

For reasons such as these, some examples presented herein provide a method of processing redirects, such as by comparing their web addresses to other recently observed redirects, to determine whether they are likely to redirect to a malicious landing domain. In a further example, the method of processing redirects blocks loading redirects determined likely to redirect to a malicious landing domain, such that the malicious landing domain is not reached by the user's computer system. In a more detailed example, a suspicion score is calculated for one or more redirects based at least in part on similarity between the redirect's domain web address and at least another redirector domain's web address or malicious landing domain web address.

Figure 1:
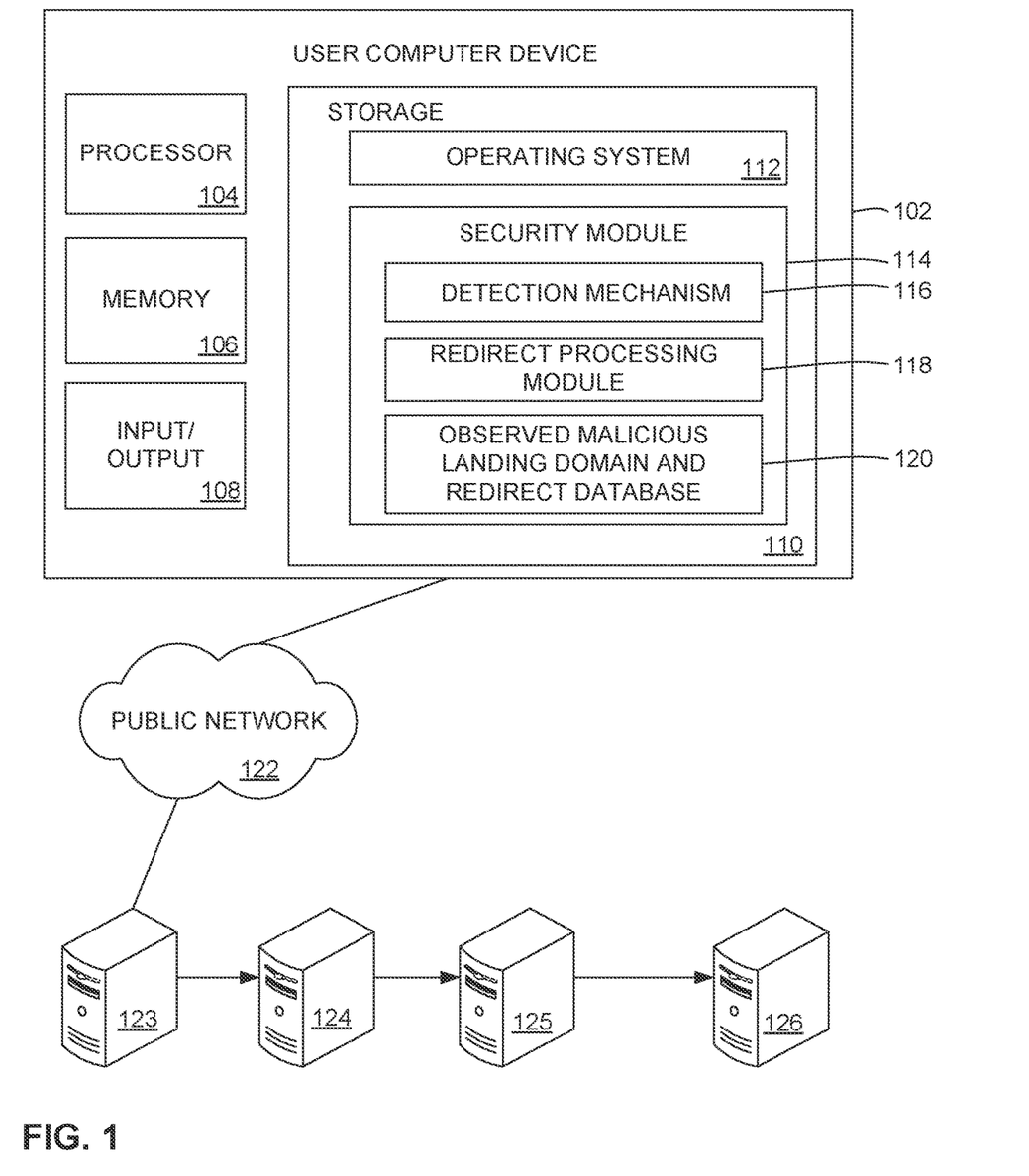
FIG. 1 is a diagram of a computerized device operable to detect and block malicious redirects, consistent with an example embodiment.

FIG. 1 is a diagram of a computerized device operable to detect and block malicious redirects, consistent with an example embodiment. Here, the user computer device 102 includes a processor 104 operable to execute computer program instructions and a memory 106 operable to store information such as program instructions and other data while computerized device 102 is operating. The user computer device exchanges electronic data, receives input from a user, and performs other such input/output operations with input/output 108. Storage 110 stores program instructions including an operating system 112 that provides an interface between software or programs available for execution and the hardware of the user computer device, and manages other functions such as access to input/output devices. The storage 110 also stores program instructions and other data for a security module 114, including a detection mechanism, such as a browser plugin 116, a redirect processing module 118, and a database of observed malicious landing domain and redirects 120. In this example, the computerized device is also coupled via a public network 122 to a large number of remote servers including one or more remote servers configured to redirect 123, 124, 125, and malicious landing domain server 126.

In operation, the user's computer device 102 uses the browser plugin 116 of security module 114 to monitor and selectively control various browser functions, such as monitoring for malicious activity or content and blocking and/or alerting the user to the malicious content found. The browser plugin 116 thus functions as a detection mechanism for malicious activity, and in alternative embodiments detections mechanisms other than a browser plugin may be used. Redirect processing module 118 in particular is operable to detect redirects encountered as a result of following web links, and to determine whether the redirects are likely associated with a malicious landing domain or eventual destination site. In a more detailed example, this is achieved by using observed malicious landing domain and redirect database 120, which in alternate embodiments is hosted on a server or elsewhere, to determine whether a redirect being evaluated is likely associated with an observed malicious landing domain such that the web browser can stop loading content before the malicious landing domain is encountered. A suspicion score is calculated for each redirect in some examples, based on the similarity between the redirector's domain web address and at least another redirector domain's web address or malicious landing domain's web address.

In one example where following a web browser link results in redirects through each of the three remote servers 123, 124, 125 before reaching malicious landing domain server 126, a user first clicks on a link pointing to the first redirect server 123. That redirect server redirects the user to the second redirect server 124, which in turn redirects the user to the third redirect server. Only the third redirect server 125 points to malicious landing domain server 126, and each of the servers change web addresses relatively often to avoid detection or characterization as malicious. Security module 114 uses browser plugin 116 and redirect processing module 118 to evaluate the redirects, using recent data (e.g. over a recent period of hours or days) including observed malicious landing domain data and/or redirect data for redirects associated with malicious landing domains.

When a web browser request from user computer device 102 encounters a redirect, redirect processing module evaluates the web address of the server redirecting web traffic and/or the new server to which the redirect points for similarity to web addresses of redirects known to be associated with observed malicious landing domains. In one example, this includes both the Uniform Resource Locator or URL name of the domain and the domain's IP address. For IP addresses, if a certain number of leading bits of the IP address (such as the first 16 or first 24 bits) match the IP address of known or suspected malicious redirects, the IP address of the redirect can be deemed suspicious. In another example using URLs, if the hostname contains a similar string to a known or suspected malicious redirect, contains a randomly generated character string, has a same subdirectory or path, or shares second-level or subdomains with a known or suspected malicious redirect, the URL of the redirect can be deemed suspicious.

In a more complex example, analysis of the redirect comprises calculating a suspicion score based on characteristics such as the IP address and URL of the redirect and/or the destination to which the redirect points, with points assigned to each characteristic based on the degree to which it suggests the associated redirect may be suspicious. For example, an IP address that matches the first sixteen bits of a known or suspected IP address may be worth five points, while an IP address that matches the first 24 bits may be worth ten points. If a threshold number of points is reached (such as thirty points), the redirect is deemed suspicious.

Upon determining a redirect is suspicious using the redirect processing module 18 and observed malicious landing domain and redirect database 120, the browser plugin module 116 stops loading redirects and alerts the user to the suspicious redirect. In a further example, the user is given the option to proceed after being warned, such as where the user knows or trusts the integrity of the landing domain or is willing to risk malicious content to continue to follow the link. In another example, an administrator is notified, such as by email or text message, of the potentially malicious content so that appropriate remedial action can be taken if necessary.

The database 120 contains in various examples known and/or suspected malicious landing domains, and/or known and/or suspicious redirects such as those associated with known and/or suspicious landing domains. These landing domains and redirects are in some examples time-filtered and/or filtered based on the number of observations reported by other computerized devices such as those running a similar security module 114. In a more detailed example, only database entries in the last several hours are considered, and a suspicious redirect or landing domain must preferably have at least twelve entries in the database to be considered a known or suspected malicious address, in alternative embodiments other numbers of database entries may be used. In other examples, other time thresholds such as a recent number of hours or days and other observation thresholds such as tens to hundreds of reported observations will be used to make a determination of whether a web address is suspicious.

In a further example, upon determination that a redirect to landing domain is suspicious, the security module's redirect processing module 118 reports the suspicious landing domain and/or redirects to a central server, which is operable to log the reported information. This ensures a broad network of computers are contributing to the database, making the database information sufficiently robust and timely to apply both time and observation incident thresholds for determining whether a web address is suspicious. The central server can then distribute the collected information to other users' computer devices for inclusion in their observed malicious landing domain and redirect databases 120, such as by updating or replacing the databases used by the security module's the redirect processing module 118.

Figure 2:
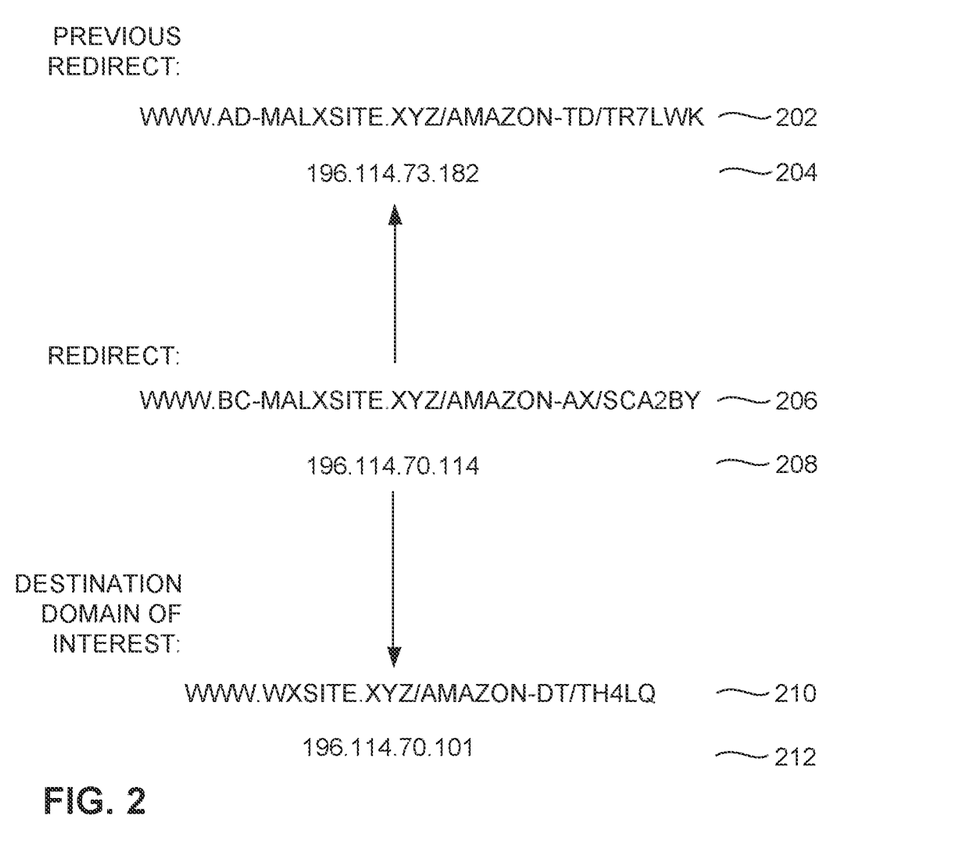
FIG. 2 shows calculation of a suspicion score for a redirect, consistent with an example embodiment.

FIG. 2 shows calculation of a suspicion score for a redirect, consistent with an example embodiment. Here, a previous redirector shown as a URL at 202 and an IP address at 204 retrieved from a database such as observed malicious landing domain and redirect database 120 of FIG. 1, due to its similarities to a redirect encountered while following a web link. The redirect is shown as a URL at 206, and an associated IP address at 208. Further, a known or suspected malicious landing domain is shown as a domain of interest as a URL at 210, and as an IP address to which the URL resolves at 212. The domain of interest may or may not be associated with the previous redirect shown at 202 and 204. The redirect as shown at 206 and 208 encountered during the course of browsing the web and following a web link has two parts —a text URL at 206 that describes the domain, subdomain, directory, and other elements regarding how to find the intended web content, and an IP address at 208 that is resolved from the domain and subdomain names via a service such as a domain name server. The redirector's URL and IP addresses are compared to both the previous redirect identified as partially matching the redirect, and to the destination domain of interest also identified as partially matching the redirect.

In this example, we consider a number of factors regarding the nature of the redirect's URL and the similarity between the redirect's URL and the URLs of similar previous redirects and destination domains of interest, and calculate a suspicion score for the URL based on these factors. First, we consider characteristics of the redirect itself, such as whether the top level domains of the domain name of the redirector are suspicious, such as "vip","xyz", or "buzz" rather than the more typical "com", "edu", or "net". Because the domain of the redirect as shown at 206 is ".xyz", we add ten points to the suspicion score. We also consider whether the redirect's domain name is similar to the domain name of a destination domain of interest. Here, we use a criteria of a character string match of at least five characters and a match of at least 35% of the length of the redirect domain. Because the redirect's domain name of BC-MALSITE does not match the destination domain of interest WXSITE as shown at 210, there is not a match and no additional points are added to the suspicion score. We then consider whether an end portion of the URL (a part of the path name, such as subdirectory or file name) appears to be randomly generated, such as when evaluated in view of known similar URLs. Here, the path name is AMAZON-AX/SCA2BY, and the portion after "AMAZON" appears to be random in view of known similar URLs and known word structures. The suspicion score is therefore incremented by another ten points. It should be understood that these factors and thresholds for determining whether a URL is suspicious are exemplary in nature and that other similarity factors and thresholds may similarly be used to determine a suspicion score.

In addition to evaluating characteristics of the URL name itself, we also evaluate the redirect with other redirects in the redirect chain pointing to the destination domain of interest, such as previous redirect shown at 202 and 204 in the redirect chain that includes the redirect shown at 206 and 208. If the redirects have the same SHA hashes, for example, the suspicion score is changed by at least a threshold amount such that the redirect is blocked right away. We also consider whether the redirect domain name is similar to the previous redirect domain name, such as whether a string match of at least five characters is found. Here, the redirect domain name of "BC-MALXSITE" matches the previous redirect's domain name of "AD-MALXSITE" by nine characters, and so is a match and therefore results in an additional two points per string match being added to the suspicion score. Redirects are also evaluated for having the same path names, with our redirect having a path name of AMAZON-AX/SCA2BY and the previous redirect having a path name of AMAZON-TD/TR7LWK. Because these are not a match, no additional points are added to the suspicious score for the redirect shown at 206. In other examples, random parts or strings of similar characters in the same path name, such as when compared to the previous redirect's path name at 202, will result in adding points to the redirect's suspicion score. Finally, we consider whether the redirect's IP address shown at 208 shares the first 16 or first 24 bits (i.e., whether the first two or three numbers 0-255 separated by periods) are a match. Here, the redirect IP address of 196.114.70.114 matches the first 16 bits of the previous redirect's IP address of 196.114.73.182, so five points are added to the redirect's suspicion score. If the first 24 bits were a match, ten points would instead have been added to the redirect's suspicion score.

Once the redirect has been evaluated using processes such as these, identifying suspicious elements of the redirect's URL or IP address, we determine whether the calculated suspicion score exceeds a threshold, such as thirty. If the suspicion score meets or exceeds the threshold value, the redirect is deemed suspicious and action such as stopping following redirects and alerting the user are taken.

In a further example, we also consider how often the identified redirect URL and/or IP address lead to a domain of interest (such as a known or suspected malicious domain from database 120), and how often the destination domain of interest has the redirect in chains leading to the destination domain of interest. In a more detailed example, we use a data set of the most popular observed destination domains of interest over a recent time period, such as the last two hours, and a minimum number of required observations of the observed destination domain of interest to be included in the database. In a further example, redirects are similarly filtered for inclusion in the database such as by setting a minimum number of observed redirect chains in which the redirect must be found to be included and a minimum percentage of times the redirect is found in redirect chains for the domain of interest.

This filtered data set therefore contains only recent redirects and domains of interest, and only domains and redirects of interest that have been observed frequently enough to be highly relevant in using to filter against redirects observed while web browsing in a user's computer system. This filtered data set can then be directly used to block recognized redirects before they result in reaching their destination domains.

Figure 3:
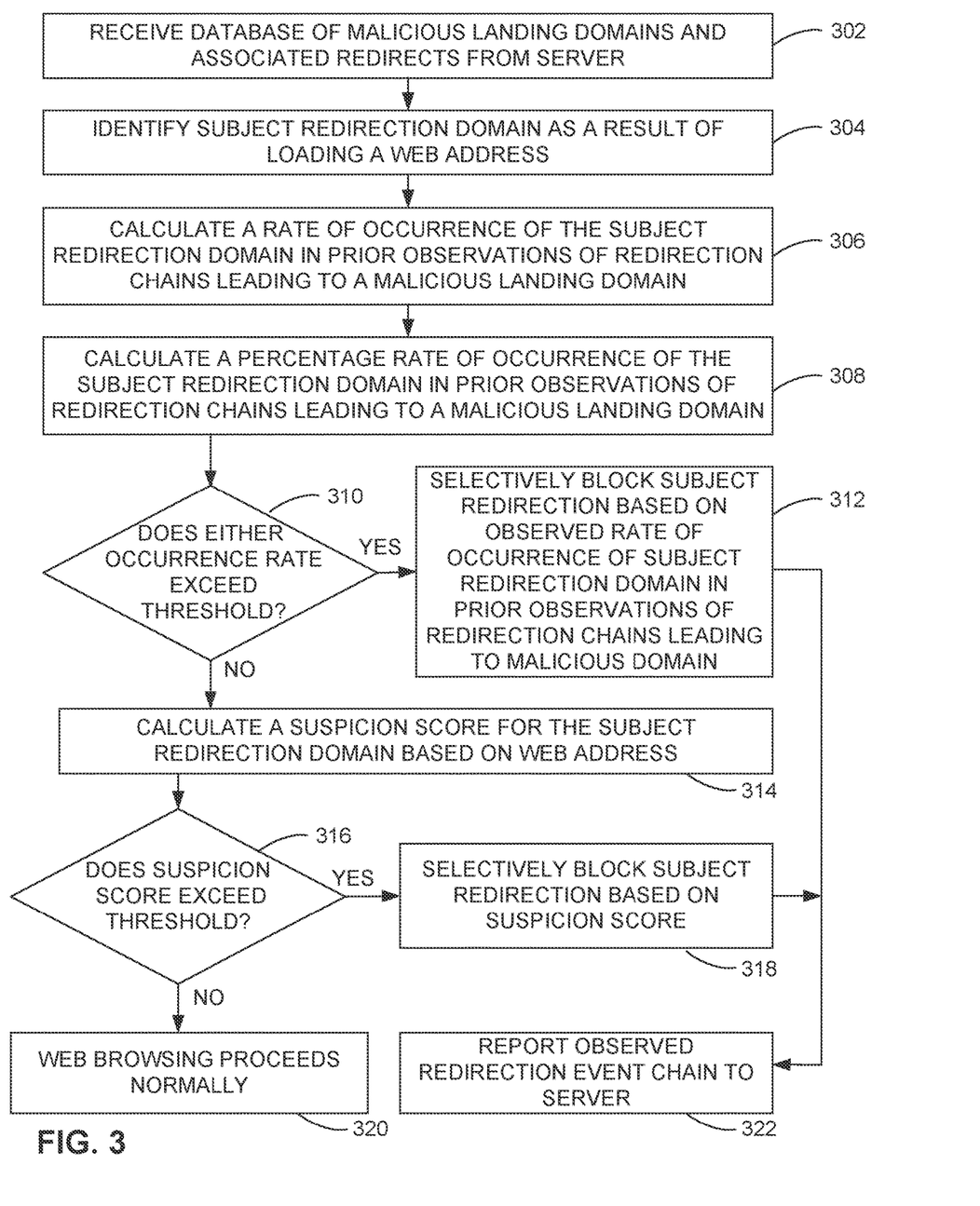
FIG. 3 is a flowchart of a method of detecting malicious URL redirection chains, consistent with an example embodiment.

FIG. 3 is a flowchart of a method of detecting malicious URL redirection chains, consistent with an example embodiment. At 302, a software module such as security module 114 of FIG. 2 receives a data set of malicious landing domains and associated redirects in one or more redirect chains leading to the respective landing domains from a remote server. In a further example, the data set is filtered for time (e.g. observations within the last two or three hours) and frequency (e.g. excluding observations that don't meet a certain threshold number of observations or occur infrequently relative to other redirects) before being stored in a local database. At 304, a web browser plugin 116 or other element of the security module identifies a redirection domain as a result of loading a web address, such as a redirection resulting from clicking on a web link in a web browser. This redirection is a subject redirection of interest, such that if it is determined to be likely associated with a malicious landing page the redirect will be stopped and the malicious landing page will not be reached or loaded.

At 306, the security module calculates a rate of occurrence of the subject redirection in prior observed redirection chains leading to malicious landing domains. Here, the number of prior occurrences is counted, which in a further example is limited to occurrences of the same redirection domain in a recent time period such as the last hour, two hours, three hours, or the like. At 308, the rate of occurrence of the subject redirection domain is calculated as a percentage of redirects leading to malicious landing domains, which again in a further example are limited to observations over a recent period of time such as the last hour or hours. A threshold is set for the number of observed occurrences and percentage rate of occurrences for the subject redirection domain, such that if the observations do not meet at least one of the thresholds, the subject redirection domain is not blocked. If the subject redirection domain does match a redirection domain observed frequently enough to meet one of the thresholds at 310, the subject redirection domain is blocked at 312.

If neither threshold is exceeded at 310, a suspicion score is calculated for the subject redirection domain based on the web address of the domain at 314. The suspicion score is in various examples based on the URL and/or IP address of the domain, relative to other web addresses in the redirect chain and/or other web addresses that are suspicious such as described in the example of FIG. 2. If the suspicion score exceeds a threshold at 316, the subject redirect is blocked at 318 based on the suspicion score exceeding the threshold. If the suspicion score does not exceed the threshold, the subject redirection is not blocked, and web browsing proceeds normally as shown at 320, such as by proceeding to the next web address in the redirection chain. If the redirection is blocked at 312 or 318, the redirection chain is reported to a server at 322, such that the subject redirection and the rest of the redirection chain can be used to calculate rates of occurrence of recent suspicious redirects in other computer systems.

The examples presented here show how methods such as calculating a suspicion score for a subject redirect in a redirection chain using the subject redirection's web address can be used to selectively block the redirection chain if a threshold suspicion is exceeded. Similarly, if the subject redirection meets a threshold rate of occurrence in association with malicious landing domains during recent observations, the subject redirection is blocked based on its statistical likelihood of being associated with a malicious landing domain. Methods such as these can effectively prevent a web browser from reaching malicious landing domains through a series of redirects as a result of following a web link that appears benign, further improving security and integrity of the user's computing device. In some example embodiments, the systems, methods, and techniques described herein are performed on one or more computerized systems having various specific components to perform these functions. Such computerized systems are able in various examples to perform the example methods and other such tasks by executing software instructions on a processor, and through use of associated hardware.

Figure 4:
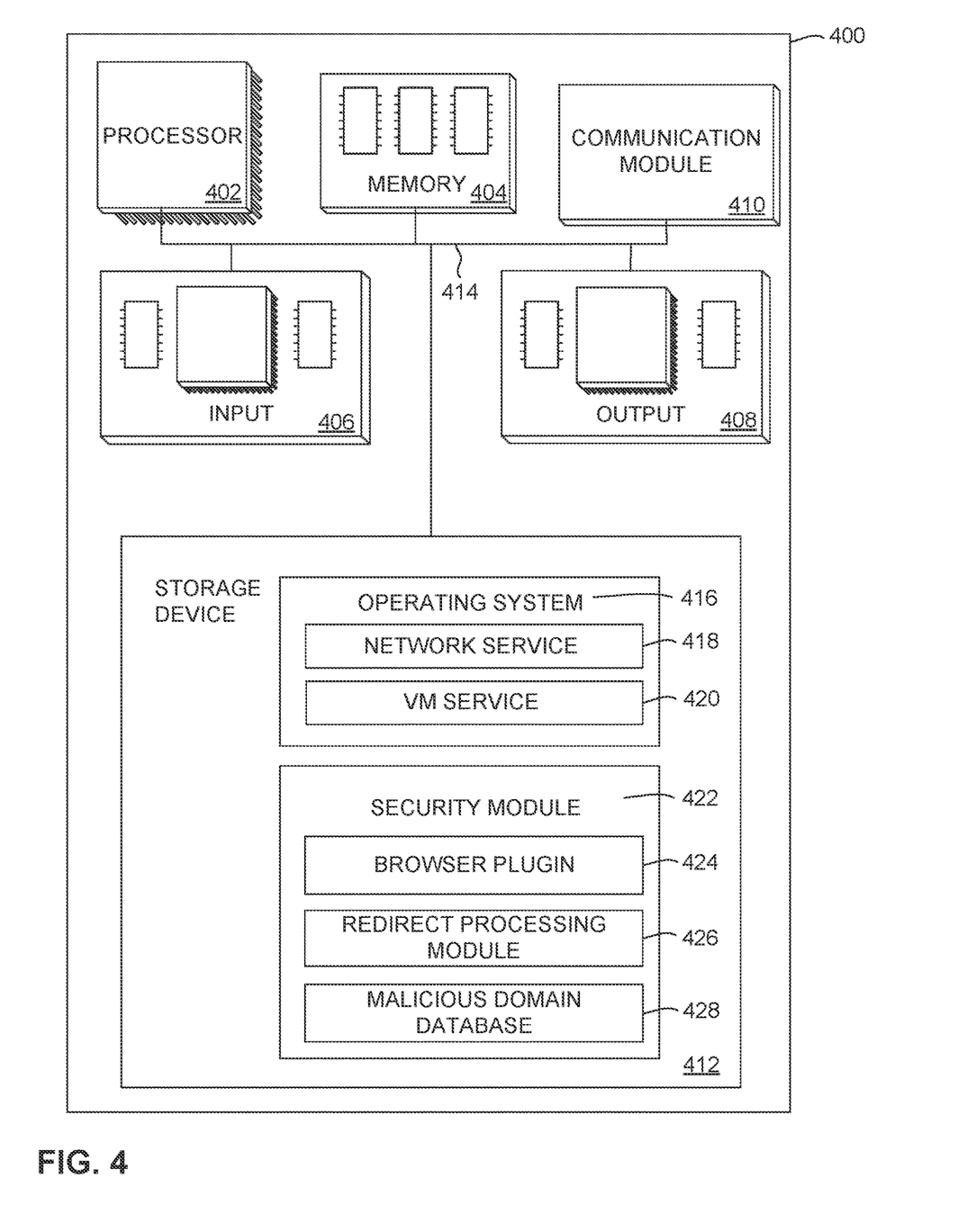
FIG. 4 is computerized system employing a security module operable to detect malicious URL redirection chains, consistent with an example embodiment.

FIG. 4 is computerized system employing a security module operable to detect malicious URL redirection chains, consistent with an example embodiment. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, security module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as security module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as security module 422 to detect and block malicious URL redirection chains.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as security module 422 to components of computing device 400. For example, operating system 416, in one example, facilitates the communication of various applications such as security module 422 with processors 402, communication unit 410, storage device 412, input device 406, and output device 408. Applications such as security module 422 may include program instructions and/or data that are executable by computing device 400. As one example, security module 422 uses browser plugin 424 and redirect processing module 426 to detect suspicious redirects such as by comparing the redirect to other redirects associated with malicious landing pages and examining the web addresses of the redirects using malicious domain database 428. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of detecting malicious web address redirection in a computerized system, comprising:

maintaining a database containing a plurality of malicious landing domains;
identifying a subject redirection domain as a result of loading a web address;
determining a suspicion score for the subject redirection domain based on a similarity between the subject redirection domain's web address and at least another redirection domain's web address;
calculating a rate of occurrence of the subject redirection domain in prior observations of redirect chains leading to any one of the plurality of malicious landing domains, wherein calculating the rate of occurrence comprises calculating a percentage of redirects leading to malicious landing domains over a recent period of time; and
blocking loading the subject redirection domain if the rate of occurrence of the subject redirection domain in prior observations of redirect chains exceeds a rate of occurrence threshold.

2. The method of detecting malicious web address redirection in a computerized system of claim 1, wherein blocking loading the redirection domain comprises blocking loading the redirector domain before a user reaches the malicious landing domain.

3. The method of detecting malicious web address redirection in a computerized system of claim 1, wherein the subject redirection domain's web address comprises at least one of a Uniform Resource Locator (URL) and an Internet Protocol (IP) address.

4. The method of detecting malicious web address redirection in a computerized system of claim 1, wherein at least one of the at least another redirection domain's web address comprises a redirection domain web address in a same redirection chain as the identified subject redirection domain.

5. The method of detecting malicious web address redirection in a computerized system of claim 1, wherein calculating a rate of occurrence of the subject redirection domain in redirect chains leading to a malicious landing domain comprises querying a database of prior observations of malicious landing domains and associated redirect chains leading to the malicious landing domains.

6. The method of detecting malicious web address redirection in a computerized system claim 1, wherein calculating a rate of occurrence of the subject redirection domain comprises calculating a number of observations of the subject redirection domain in prior observations of redirection chains leading to a malicious landing domain.

7. The method of detecting malicious web address redirection in a computerized system of claim 1, wherein calculating a rate of occurrence of the subject redirection domain comprises calculating a percentage rate at which the subject redirection domain was observed in prior observations of redirection chains leading to a malicious landing domain.

8. The method of detecting malicious web address redirection in a computerized system of claim 1, wherein calculating a rate of occurrence of the subject redirection domain comprises calculating a percentage rate of occurrence of the subject redirection domain in past observations of redirections in redirection chains leading to a malicious landing domain.

9. The method of detecting malicious web address redirection in a computerized system of claim 1, further comprising reporting redirections leading to a malicious landing domain to a server.

10. A computerized system, comprising:
a processor;
a memory; and
nonvolatile storage configured to store program instructions, the program instructions operable when executed to cause the computerized system to:
maintain a database containing a plurality of malicious landing domains;
identify a subject redirection domain as a result of loading a web address;
determine a suspicion score for the subject redirection domain based on a similarity between the subject redirection domain's web address and at least another redirection domain's web address;
calculate a rate of occurrence of the subject redirection domain in prior observations of redirect chains leading to any one of the plurality of malicious landing domains, wherein calculating the rate of occurrence comprises calculating a percentage of redirects leading to malicious landing domains over a recent period of time; and
block loading the subject redirection domain if the rate of occurrence of the subject redirection domain in prior observations of redirect chains exceeds a rate of occurrence threshold.

11. The computerized system of claim 10, wherein blocking loading the redirection domain comprises blocking loading the redirector domain before a user reaches the malicious landing domain.

12. The computerized system of claim 10, wherein the subject redirection domain's web address comprises at least one of a Uniform Resource Locator (URL) and an Internet Protocol (IP) address.

13. The computerized system of claim 10, wherein at least one of the at least another redirection domain's web address comprises a redirection domain web address in a same redirection chain as the identified subject redirection domain.

14. The computerized system of claim 10, wherein calculating a rate of occurrence of the subject redirection domain in redirect chains leading to a malicious landing domain comprises querying a database of prior observations of malicious landing domains and associated redirect chains leading to the malicious landing domains.

15. The computerized system claim 10, wherein calculating a rate of occurrence of the subject redirection domain comprises calculating a number of observations of the subject redirection domain in prior observations of redirection chains leading to a malicious landing domain.

16. The computerized system of claim 10, wherein calculating a rate of occurrence of the subject redirection domain comprises calculating a percentage rate at which the subject redirection domain was observed in prior observations of redirection chains leading to a malicious landing domain.

17. The computerized system of claim 10, wherein calculating a rate of occurrence of the subject redirection domain comprises calculating a percentage rate of occurrence of the subject redirection domain in past observations of redirections in redirection chains leading to a malicious landing domain.

18. The computerized system of claim 10, the program instructions further operable when executed to cause the computerized system to report redirections leading to a malicious landing domain to a server.

* * * * *